March 11, 1941.    A. W. COFFMAN    2,234,517
LAMINATED BUILDING SHEET
Filed April 15, 1938    3 Sheets-Sheet 1

INVENTOR
Alden W. Coffman
BY J. Stanley Churchill
ATTORNEY

March 11, 1941.                A. W. COFFMAN                2,234,517
                             LAMINATED BUILDING SHEET
                          Filed April 15, 1938        3 Sheets-Sheet 2
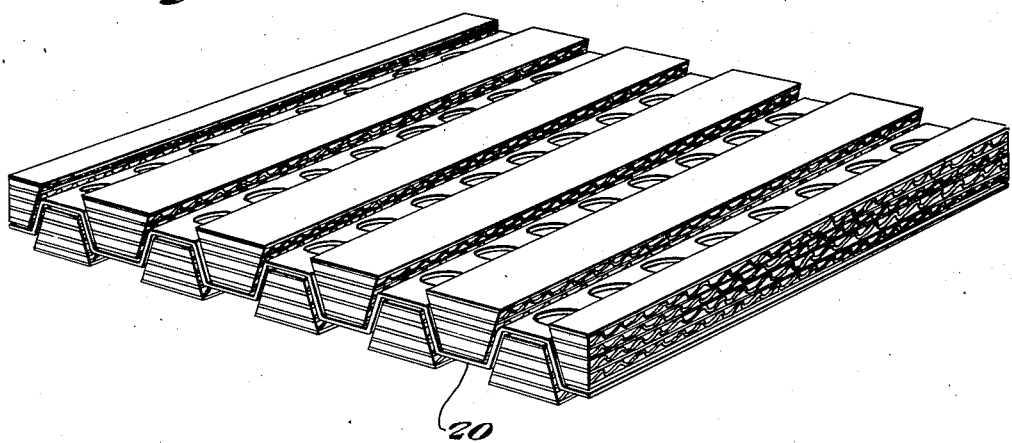
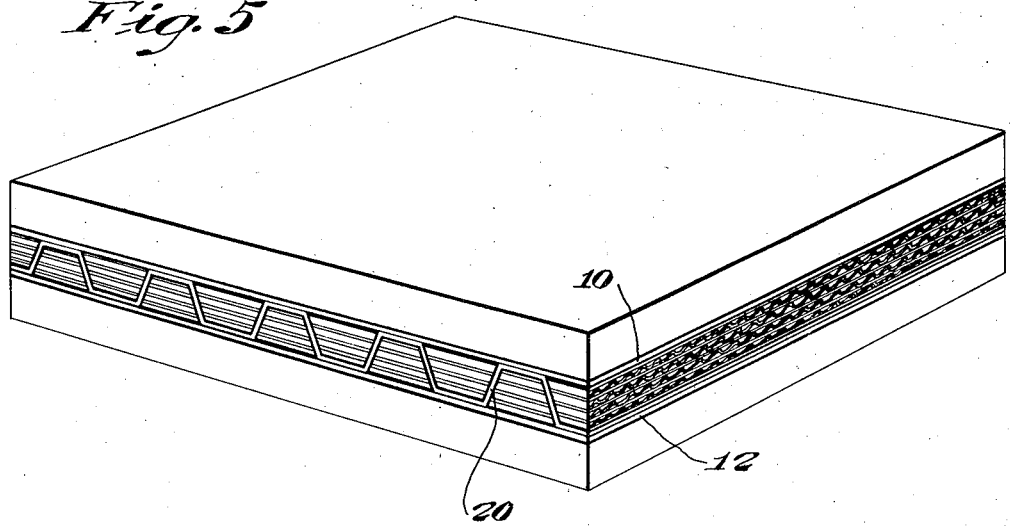
INVENTOR
BY Alden W. Coffman
J. Stanley Churchill
ATTORNEY Patented Mar. 11, 1941

2,234,517

UNITED STATES PATENT OFFICE 2,234,517

LAMINATED BUILDING SHEET

Alden W. Coffman, Pittsburgh, Pa., assignor to H. H. Robertson Company, Pittsburgh, Pa., a corporation of Pennsylvania Application April 15, 1938, Serial No. 202,267

1 Claim. (Cl. 189—34)

This invention relates to a laminated building sheet.

In general, one object of the invention is to provide a novel and improved laminated building sheet adapted for use for building and paneling purposes, which is preferably incombustible, light in weight, corrosion resistant and relatively non-frangible, which lends itself to decoration and possesses sufficient strength, rigidity and the ability to resist compression to an extent such as to enable the sheet to be used as a panel unit.

Another object of the invention is to provide a novel and highly efficient method for the economical production of the present building sheet or panel.

With these general objects in view and such others as may hereinafter appear, the invention consists in the laminated building sheet, the various structures, arrangements and combinations of parts, and in the method of producing the laminated building sheet as hereinafter described and particularly defined in the claim at the end of this specification.

Figure 1:
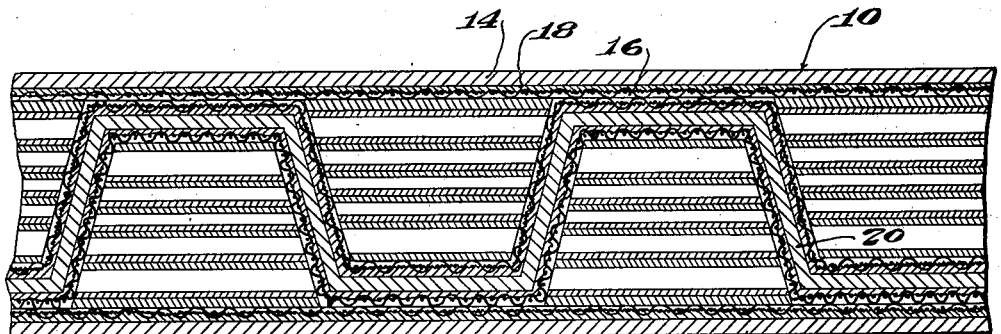
Figure 2:
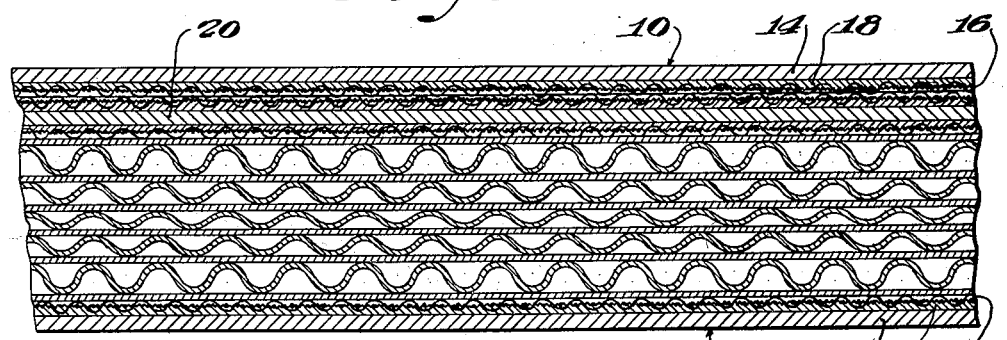
Figure 3:
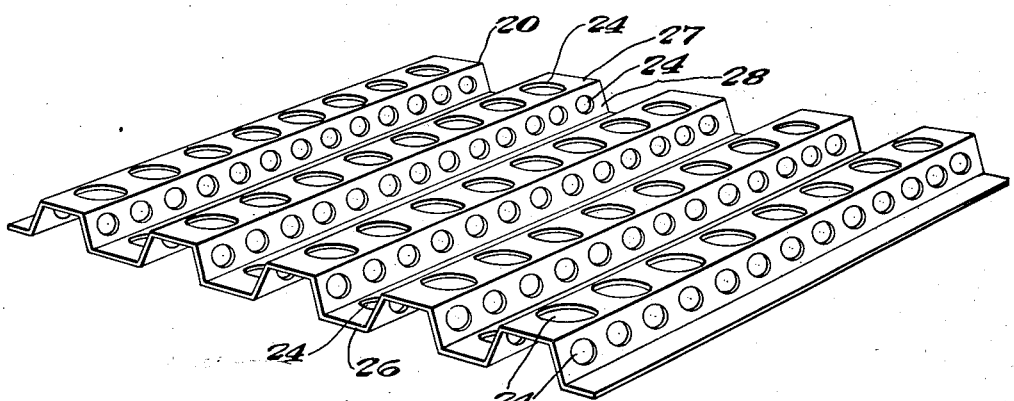
Figure 6:
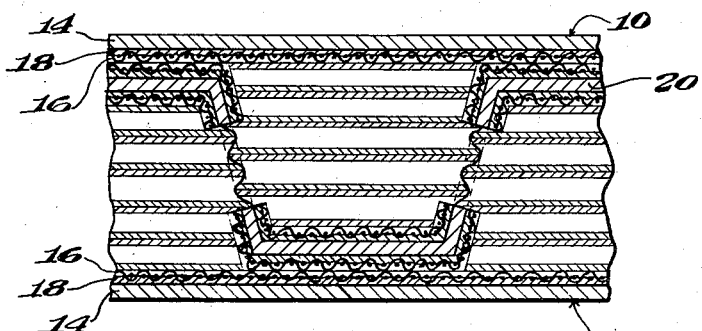
Figure 7:
Figure 8:
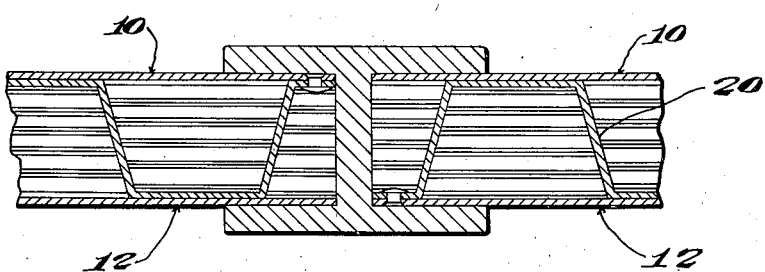
Figure 9:
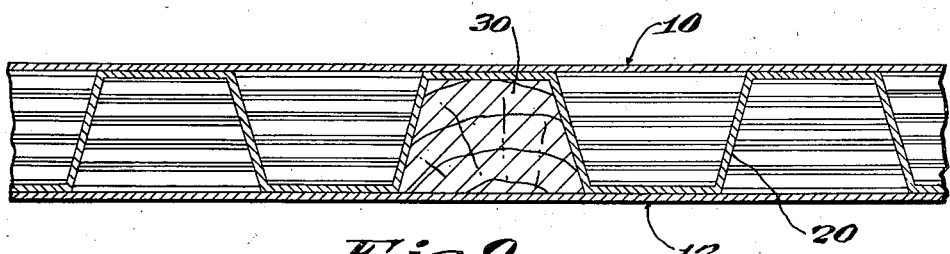

In the drawings, Fig. 1 is a cross-section of the present laminated building sheet; Fig. 2 is a similar view taken at right angles to the section shown in Fig. 1; Fig. 3 is a perspective of the metal spacing member employed in the construction of the present building sheet; Fig. 4 is a perspective illustrating the partial assembly of the insulating members in operative position with relation to the spacing member; Fig. 5 is a perspective illustrating the assembly of facing sheets, spacing member and insulating members together with suitable platens for effecting compression of the insulating members and bonding of the facing sheets and spacing members to the balance of the assembly; Fig. 6 is a detail in section illustrating the interlocking or keying of the insulating members through openings in the legs of the spacing member, as will be described; Fig. 7 is a sectional view of a modified laminated building sheet illustrating a non-cellular insulating member; Fig. 8 is a detail illustrating two laminated building sheets or panels erected in operative position with respect to the supporting member of a building, and Fig. 9 is a sectional detail of the present laminated building sheet showing a modified form of filler, particularly adapted to enable accessories and other members to be secured to the panel.

In general, the preferred embodiment of the invention contemplates a laminated building sheet comprising two metal facing sheets which are maintained in spaced relation by interposed metal spacing means secured to the facing sheets to form a laminated unit. The spacing means may comprise a corrugated sheet metal member in which the bottoms of the corrugations are flat to facilitate attachment to the facing sheets and to provide sufficient area from which holes may be punched to lighten the spacing member without appreciably detracting from the strength of the composite panel. The side walls of the corrugations are preferably arranged to diverge somewhat toward the open mouths of the corrugations and are preferably provided with holes punched therefrom to further lighten the composite structure, and these holes are preferably of such size as to retain a large percentage of the original strength of the side walls of the spacing member. Provision is preferably made for filling the space between the facing sheets with a relatively light-weight non-combustible filler. This filler may take various forms depending to some extent upon the use to which the panel is to be put. In the preferred embodiment of the invention, the filler comprises cellular asbestos and the cells thereof are preferably arranged to extend transversely with respect to the direction of extension of the corrugations of the spacing member to assist in reenforcing the side walls of the corrugations of the spacing member against deformation upon compression of the completed panel. The holes, in addition, serve to enable a filler to key into the spacer, for a purpose to be described.

In the preferred method of making the present laminated panel the spacing member may be provided with the lightening openings above referred to, and then corrugated. The cellular asbestos filler is then preferably cut into bar form shaped to correspond to the individual corrugations of the spacing member but of a depth equal to or exceeding the depth of the corrugations and with the cells thereof extending transversely of the elongated insulating bars thus formed. The bars in this condition are placed in the individual corrugations and then the sheet metal facing sheets are placed in position and the assembly subjected to compression between suitable platens or other means. The attachment of the facing sheets to the spacing member, and preferably also to the filler, may be effected in various ways, preferably by adhesively affixing the facing sheets to the spacing member and filler. During the compression of the assembled structure the individual insulating bars are compressed until the under surface of the facing sheet is brought into intimate contact with the tops of the corrugations of the spacing member, and this action serves to cause a keying of the insulating filler material into the holes provided in the side walls of the corrugations of the spacing member. The assembled and compressed structure is maintained under compression until the facing sheets have become bonded to the spacing member to form a unitary structure. The facing sheets may and preferably will comprise the "bonded metal sheets" now being manufactured under the United States Patent to Coffman, No. 2,068,533, dated January 19, 1937, and as therein shown, such "bonded metal" comprises a metal sheet to one or both surfaces of which a fibrous sheet is attached by an interposed layer of metal adhesive. The spacing member is also preferably made of "bonded metal" coated on two sides with fibrous material and the contiguous fibrous surfaces of the facing sheets and spacing member may be adhesively affixed and bonded together by suitable adhesive such as phenolic resins, glues and other adhesives available in the art. The remaining surfaces of the facing sheets and spacing member may and preferably will be impregnated with suitable material to assist in protecting them against corrosion during use of the panel, and in practice, it is preferred to employ the adhesive as the protective impregnating material.

Referring now to the drawings, 10, 12 represent laminated fibrous-metal sheets produced in accordance with the Coffman patent above referred to, and each may comprise a light gauge metal sheet 14 having fibrous sheets 16 such as asbestos felt or cotton cloth secured to the surfaces of the metal sheets by interposed layers of metal adhesive, indicated generally at 18. Such sheets are obtainable upon the market under the name "bonded metal sheets." The laminated "bonded metal" sheets 10, 12 comprise facing sheets for the present laminated building sheet and are maintained in spaced relation by interposed metallic spacing means, indicated generally at 20. The metallic spacing means may and preferably will be formed of "bonded metal."

The spacing member 20 serves to increase the stiffness of the laminated sheet and also to increase its resistance to compression and impact. The spacing member further assists in maintaining flat surfaces on the completed laminated sheet or panel, and this feature is particularly important in those instances where the sheet is to be used as a panel and have a decorative appearance. The spacing member further assists in maintaining a constant definite thickness under varying conditions of humidity and temperature. Some filler members which are suitable for use between the facing sheets of the present laminated sheet expand and contract under varying humidity and temperature conditions and consequently the use of this rigid spacing member to counteract this tendency is particularly important.

As above set forth, the spacing member and the facing sheets may be formed of light-gauge sheet metal in order that the finished panel or sheet may be relatively light in weight. For many commercial purposes, particularly for construction of marine panels, the requisite lightness and strength may be most advantageously secured in the present construction of laminated sheet by providing lightening holes 24 in the bottoms 26 and tops 27 of the corrugations and also in the side walls 28 of the corrugations. I have found that in order to retain sufficient strength and resistance to compression it is desirable that the lightening holes in the side walls of the corrugations be of substantially less size and/or number as compared with corresponding holes in the bottoms and tops of the corrugations, the limiting factors being the retention of sufficient area or surface in the bottom walls of the corrugations to enable the facing sheets to be efficiently and satisfactorily bonded thereto while in the side walls of the corrugations of the spacing member the openings must not substantially detract from the strength of these walls as compression members.

In producing the present core sheet, the "bonded metal," made in accordance with the Coffman patent above referred to, is shaped to provide corrugations preferably of the form illustrated, in which the bottoms and tops of the corrugations are flat and the side walls arranged to diverge outwardly, slightly toward the mouth of the corrugations. Such a sheet may be formed by rolling, by corrugating by bending on a sheet metal brake, and in various other commercial ways. The lightening holes are preferably punched out of the proper portions of the "bonded metal" sheet prior to its formation into corrugated form. After the formation of the corrugated spacing member the latter may be impregnated with the same material, such as a phenolic resin, to be employed in adhesively affixing the facing sheets thereto, and the next step in the preferred method of producing the present laminated panel comprises the disposition of filler members within the various corrugations of the spacing member. In practice it is preferred to employ cellular asbestos as the filler member and individual bars of the form illustrated in Fig. 4, are cut or otherwise formed from sheets of the cellular asbestos and are preferably of a depth equal to or exceeding the depth of the corrugations.

The facing sheets, the spacing member and the filler members are then assembled in operative relation to one another and the assembly placed between the platens and subjected to pressure. The filler members are compressed and caused to key into the holes in the side walls of the corrugated spacing members and the compression of the assembly is continued until the inner surfaces of the facing members are brought into intimate contact with the tops and bottoms of the corrugations of the spacing member, thus insuring the production of flat surfaces upon the facing members and the assembly is maintained in this condition until opportunity is afforded for the adhesive to thoroughly bond the facing sheets with the spacing member. The adhesive may comprise a phenolic resin, glue or other adhesive available in the art and such adhesive is preferably applied to either the adjacent surfaces of the facing sheet or to the tops and bottoms of the spacer member or to both. Depending upon the type of adhesive used, the platens will be operated either hot or cold.

If desired, and as shown in Fig. 9, a strip 30 may be interposed in selected corrugations of the spacing member for the purpose of receiving nails, screws and other fastening devices, and such strip may be of wood or other composition or material capable of serving this purpose.

As illustrated in Fig. 8, provision may be made for mechanically fastening either or both facing sheets 10, 12 to the spacing member. When the facing sheets are adhesively affixed to the spacing member, it is desirable to provide such a mechanical fastening in order that in case of a severe fire during which the adhesive might be rendered ineffective, the facing sheets may be held in a position, even though they may buckle, such as to prevent the free passage of flame from one side of the wall to the other.

Among other uses, the present laminated building sheet is particularly suitable for marine panel construction. In the past, marine panels have been constructed from plywood and over a period of years plywood paneling has been superceded by combinations of plywood and metal. Similarly combinations of balsawood and heavier woods, together with metal, have been employed, but due to disasters at sea caused by fire, recent regulations have eliminated the use of such combustible paneling materials for bulkheading work on shipboard. Certain incombustible panels have been presented for use in the marine field but have had the drawbacks of low strength and relatively heavy weights, the large proportion of which weigh not less than approximately 3½ pounds per square foot. The paneling embodying the present invention eliminates, to a large extent, the above drawbacks since it is possible to achieve an exceptionally rigid, strong panel using sheet metal of 30 gauge and 28 gauge, with resulting panel weight of approximately 3 pounds per square foot.

While in the preferred embodiment of the invention, two sheet metal facing sheets are employed, it is not desired to limit the invention in this respect, as for some purposes one of the facing sheets may be omitted, providing the filler is secured in the spacing member.

While the preferred embodiment of the invention has been herein illustrated and described, it will be understood that the invention may be embodied in other forms within the scope of the following claim.

Having thus described the invention, what is claimed is:

A laminated building sheet or panel comprising two spaced metal facing sheets and a corrugated metal spacing member interposed between the facing sheets and having the tops and bottoms of the corrugations secured to the facing sheets to form a unitary and relatively rigid structure, the side walls of said corrugations being provided with openings and a cellular filler within the cells formed by the corrugations and the facing sheets, and with the cells of the filler disposed transversely of the corrugations and substantially parallel to the facing sheets and cooperating with the side walls thereof to resist deformation of the same under pressure.

ALDEN W. COFFMAN.